(12) United States Patent
Tolkacz

(10) Patent No.: US 7,729,824 B2
(45) Date of Patent: Jun. 1, 2010

(54) REMOTE DIAGNOSTIC SYSTEM FOR DETECTING TAMPERING OF VEHICLE CALIBRATIONS

(75) Inventor: Joseph M. Tolkacz, Novi, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 991 days.

(21) Appl. No.: 11/194,139

(22) Filed: Jul. 29, 2005

(65) Prior Publication Data

US 2007/0027592 A1 Feb. 1, 2007

(51) Int. Cl.
*G06F 17/00* (2006.01)
*G06F 19/00* (2006.01)

(52) U.S. Cl. ........................................................ 701/33
(58) Field of Classification Search ........................ None
See application file for complete search history.

(56) References Cited

U.S. PATENT DOCUMENTS

| | | | |
|---|---|---|---|
| 5,737,330 A * | 4/1998 | Fulthorp et al. | 370/346 |
| 5,815,071 A | 9/1998 | Doyle | 340/439 |
| 5,884,210 A * | 3/1999 | Rettig et al. | 701/115 |
| 6,629,031 B2 * | 9/2003 | Gustavsson et al. | 701/35 |
| 7,092,803 B2 | 8/2006 | Kapolka et al. | 701/29 |
| 2002/0012323 A1 * | 1/2002 | Petite et al. | 370/252 |
| 2003/0055552 A1 * | 3/2003 | Akins et al. | 701/114 |
| 2005/0065678 A1 | 3/2005 | Smith et al. | 701/29 |

FOREIGN PATENT DOCUMENTS

| WO | WO0217184 A1 | 2/2002 |
|---|---|---|
| WO | WO03077205 A2 | 9/2003 |

* cited by examiner

*Primary Examiner*—Michael J. Zanelli

(57) ABSTRACT

A tampering diagnostic system for a vehicle comprises a control system that stores calibration data. A transmitter selectively wirelessly transmits the calibration data. A service assistance system that is remote from the vehicle receives the calibration data wirelessly from the transmitter. A manufacturer information system receives the calibration data from the service assistance system, compares the calibration data to factory calibration data, and selectively generates a tampering flag based on the calibration data.

14 Claims, 8 Drawing Sheets

REMOTE DIAGNOSTIC SYSTEM FOR DETECTING TAMPERING OF VEHICLE CALIBRATIONS

FIELD OF THE INVENTION

The present invention relates generally to vehicle control systems, and more particularly to a vehicle tampering remote diagnostic system.

BACKGROUND OF THE INVENTION

Automobile manufacturers guarantee the quality of their vehicles by offering limited warranties. The warranty typically includes powertrain components of the vehicle. For example, if a powertrain component malfunctions, the manufacturer will repair the powertrain component at no additional cost to the customer.

The manufacturer tests, evaluates, and adjusts engine and transmission calibration data to optimize emissions, performance, durability and/or other design factors. Some customers may replace factory calibration data in an attempt to modify and/or improve the performance of their vehicle. The warranty typically excludes damage that occurs due to user modification. However, user modification may be difficult to detect.

For example, powertrain calibration data relating to electronic throttle control (ETC), fuel injection, transmission shift points, and/or turbocharger and supercharger set points may be modified to enhance vehicle performance. Increasing performance may damage and/or accelerate wear on the powertrain components. When damage occurs, some customers may reprogram the modified calibration data back to the factory calibration data and attempt to have damaged parts repaired under warranty. Without proof of the customer's modification, the manufacturer must honor the warranty, which unnecessarily increases warranty costs.

SUMMARY OF THE INVENTION

A tampering diagnostic system for a vehicle comprises a vehicle control system that stores calibration data. A transmitter selectively wirelessly transmits the calibration data.

In other features, a system comprises the tampering diagnostic system and further comprises a service assistance system that is remote from the vehicle and that receives the calibration data wirelessly from the transmitter. A manufacturer information system receives the calibration data from the service assistance system, compares the calibration data to predetermined calibration data, and selectively generates a tampering flag based on the comparison.

In other features, a remote service assistance system in the vehicle includes the transmitter and receives the calibration data from the vehicle control system. The manufacturer information system comprises an error check module that checks for data transmission errors in the calibration data using a cyclic redundancy check. The manufacturer information system further comprises a tampering check module that compares the calibration data with the predetermined calibration data and generates a tampering flag when the calibration data is not equal to the predetermined calibration data. The manufacturer information system further comprises a database that includes a vehicle service file associated with the vehicle. The tampering flag is associated with the vehicle service file. The vehicle control system includes a powertrain control system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. As used herein, the term module or device refers to an application specific integrated circuit (ASIC), an electronic circuit, a processor (shared, dedicated, or group) and memory that executes one or more software or firmware programs, a combinational logic circuit, and/or other suitable components that provide the described functionality.

According to the present invention, a manufacturer can detect tampering of calibration data with the help of a service assistance system, such as OnStar® by General Motors. Exemplary calibration data may include, but is not limited to, throttle position, fuel injection calibration data, transmission shift points, turbocharger calibration data, and/or supercharger calibration data. The service assistance system receives calibration data from the vehicle, and transmits the calibration data to a manufacturer information system. More specifically, the vehicle may transmit the calibration data after a predetermined number of engine starts, randomly and/or using other criteria. Upon receiving the calibration data, the manufacturer information system determines whether tampering of the calibration data has occurred.

Figure 1A:
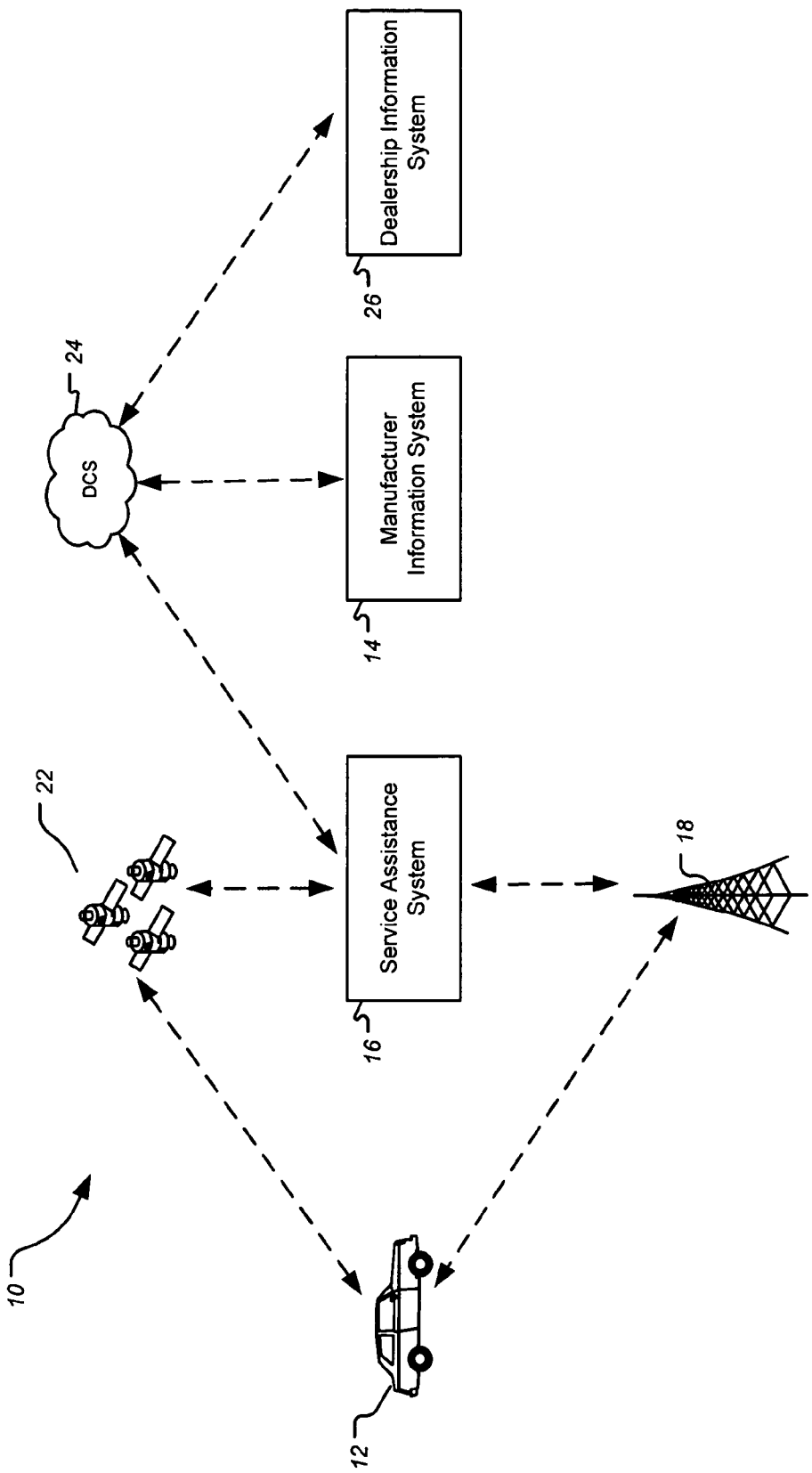
FIG. 1A illustrates a vehicle tampering remote diagnostic system according to the present invention.

Referring now to FIG. 1A, in an exemplary embodiment according to the present invention, a vehicle tampering remote diagnostic system 10 includes a vehicle 12, a manufacturer information system 14, a service assistance system 16, and a dealership information system 26. Calibration data is transmitted from the vehicle 12 to the service assistance system 16 wirelessly using terrestrial and/or satellite links. The terrestrial link may include, but is not limited to, a cellular wireless network 18. The satellite link may include one or more satellites 22. The service assistance system 16 transmits the calibration data to the manufacturer information system 14 through a distributed communication system (DCS) 24. The DCS 24 can include a wide area network (WAN), the internet, a connection over public switch telephone network (PSTN), and/or other networks. The manufacturer information system 14 selectively transmits a tampering status of the vehicle 12 via the distribution communication system (DCS) 24 to the dealership information system 26.

Figure 1B:
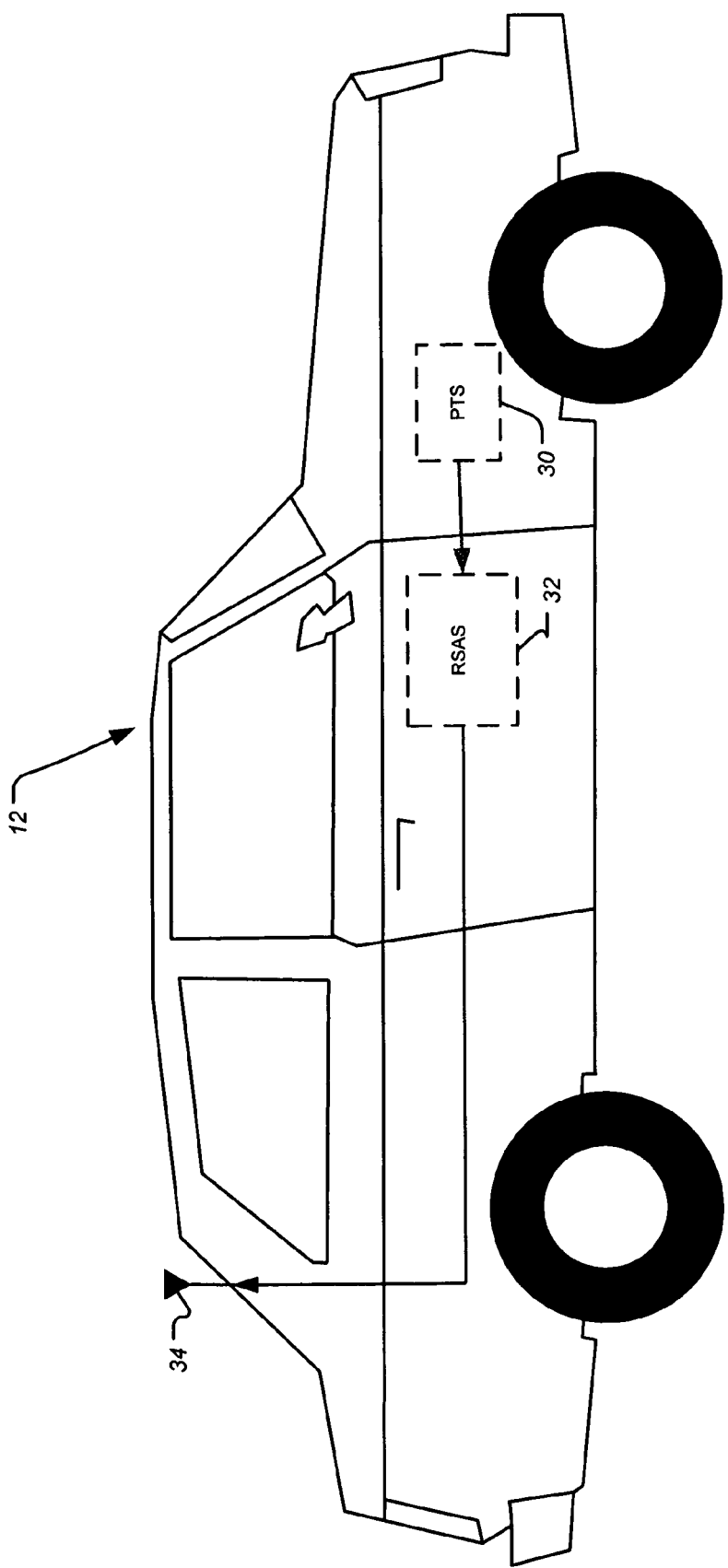
FIG. 1B illustrates a vehicle including a powertrain control system and a remote service assistance system remote service assistance system according to the present invention.

Referring now to FIG. 1B, the vehicle 12 includes a powertrain control system 30 that communicates with a remote service assistance system 32. The powertrain control system 30 is programmed with factory calibration data to control the operation of powertrain components of the vehicle 12. The remote service assistance system 32 interfaces a vehicle operator with the service assistance system 16 for service requests. For example, the service assistance system 16 may communicate driving directions, location, and/or other requests through the remote service assistance system 32. The remote service assistance system 32 receives calibration data from the powertrain control system 30, and transmits the calibration data to the service assistance system 16 via an antenna 34.

Figure 2A:
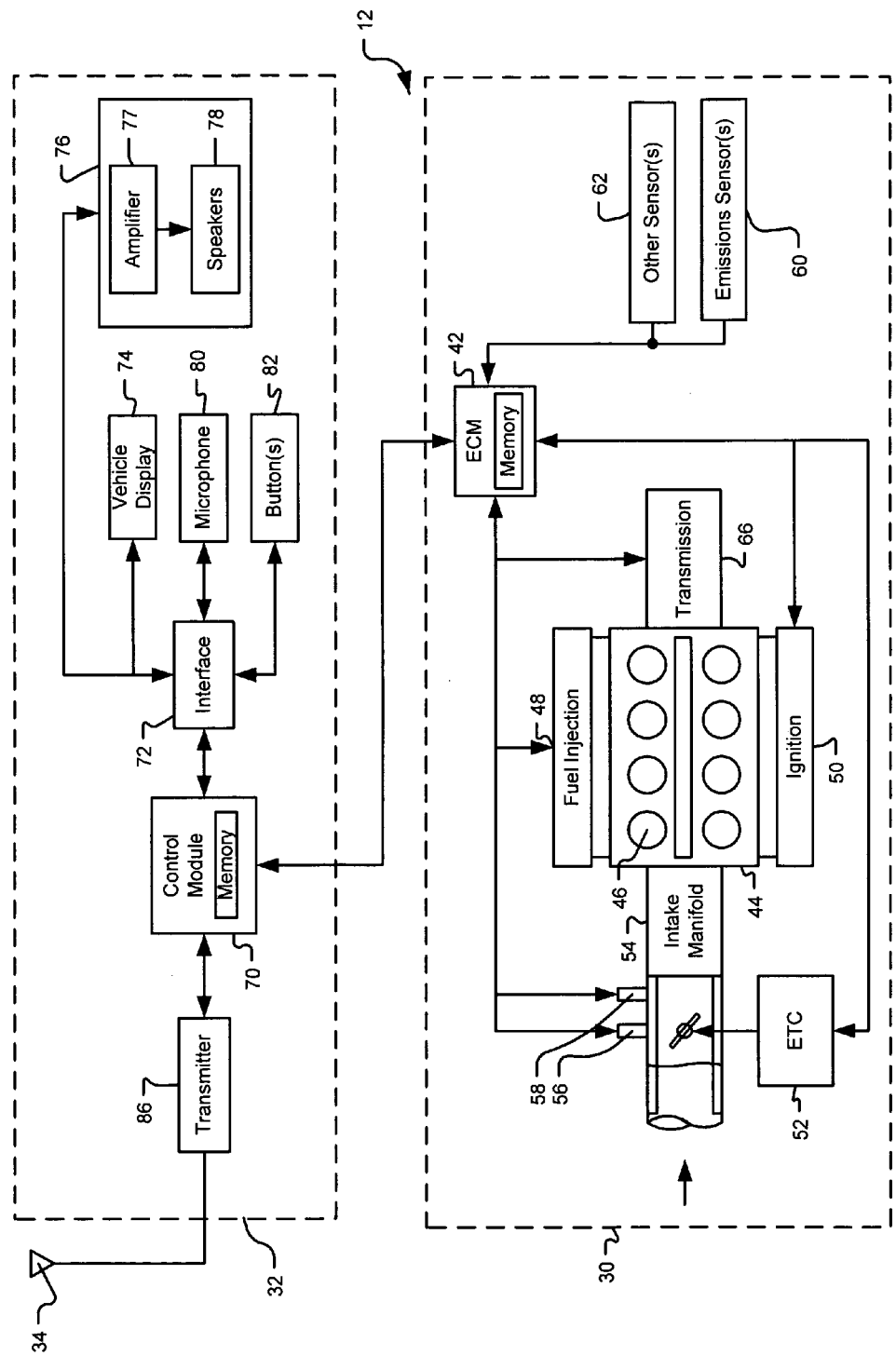
FIG. 2A is a functional block diagram further illustrating the powertrain control system and the remote service assistance system according to the present invention.

Referring now to FIG. 2A, the powertrain control system 30 includes an engine control module (ECM) 42 and an engine 44. The engine 44 includes a plurality of cylinders 46 each with one or more intake valves and/or exhaust valves (not shown). The engine 44 further includes a fuel injection system 48 and an ignition system 50. An electronic throttle control (ETC) 52 adjusts the throttle position in an intake manifold 54 based upon a position of an accelerator pedal (not shown) and a throttle control algorithm that is executed by the ECM 42. One or more sensors 56 and 58 such as a manifold pressure sensor and/or a manifold air temperature sensor, sense pressure and/or air temperature in the intake manifold 54. Emission sensors 60 and other sensors 62 such as a temperature sensor, a barometric pressure sensor, and/or other conventional sensors are used by the ECM 42 to control the air/fuel ratio and emissions of the engine 44. Drive torque produced by the engine 44 is transferred by a transmission 66 to the front and/or rear wheels (not shown) of the vehicle 12.

A control module 70 is connected to an input/output interface 72. The control module 70 communicates with the ECM 42, which may be stand alone (as shown) or integrated with the ECM 42. The control module 70 communicates via interface 72 with a vehicle display 74, a vehicle sound system 76, a microphone 80, and/or a set of input/output control buttons 82. The vehicle display 74 allows the vehicle 12 to display information provided by the powertrain control system 30 and the service assistance system 16 such as: performance specifications, date, time, and/or global positioning. The vehicle sound system 76 allows the vehicle 12 to output audio from the service assistance system 16. An amplifier 77 amplifies the signal and outputs the sound through a plurality of speakers 78. The microphone 80 and the set of buttons 82 allow the user of the vehicle 12 to communicate with the service assistance system 16. A transmitter 86 transmits calibration data via the antenna 34.

Figure 2B:
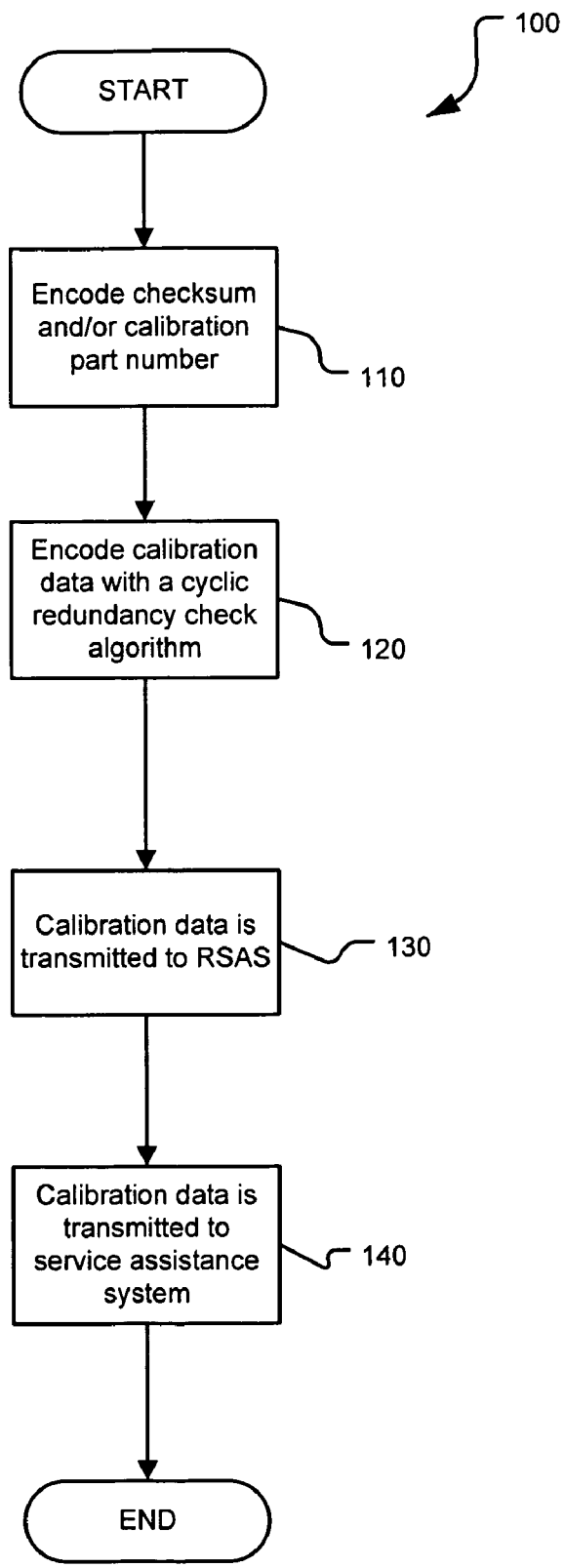
FIG. 2B is a flow chart illustrating steps for transmitting calibration data from the powertrain control system to a service assistance system according to the present invention.

Referring now to FIG. 2B, a data transmission method 100 illustrates the encoding of calibration data and the transmission of calibration data to the service assistance system 16 according to the present invention. In step 110, the calibration data is encoded. For example, in the present implementation, the ECM 42 encodes checksum data and/or a calibration part number of the calibration data. However, those skilled in the art can appreciate that other data types may be encoded as well. In this manner, it is more difficult for a user to modify the calibration data (i.e. to update the checksum data and/or calibration part number data). In other words, a user is not able to simply modify the calibration data and recalculate the checksum data.

In step 120, the ECM 42 encodes calibration data with a cyclic redundancy check (CRC) algorithm to detect data errors that may occur during data transmission. More specifically, the CRC algorithm adds one or more bits to the blocks of calibration data. The added bits are used to determine, identify, and/or correct data errors. After data is transmitted to the manufacturer information system 14, the added bits are used to check the calibration data. If an error is detected, the calibration data is corrupted and may be discarded. In step 130, the ECM 42 transmits the calibration data to the remote service assistance system 32. In step 140, a transmitter 86 transmits the calibration data via the antenna 34 to the service assistance system 16.

Figure 3A:
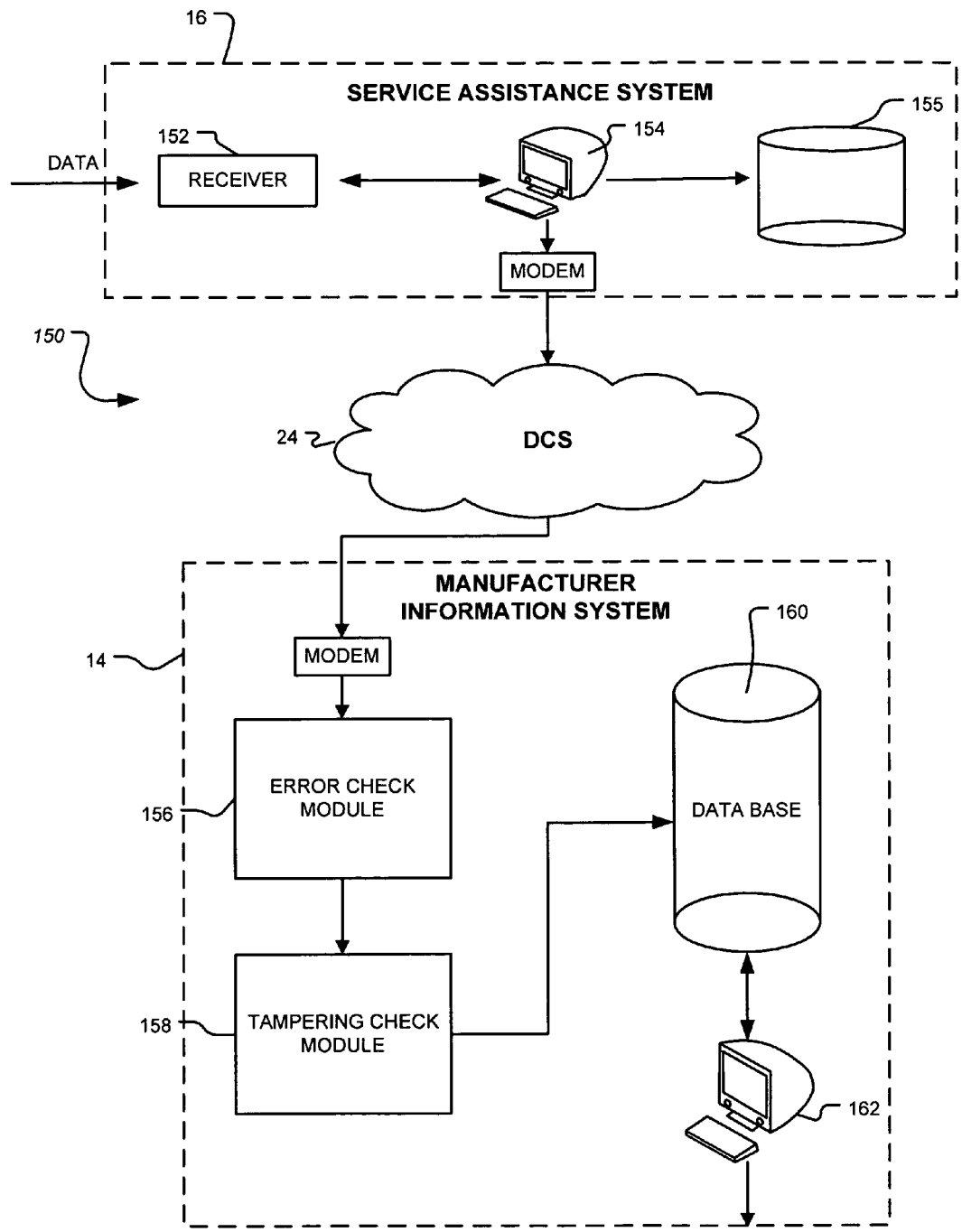
FIG. 3A is a functional block diagram illustrating the service assistance system and a manufacturer information system according to the present invention.

Referring now to FIG. 3A, a functional block diagram 150 includes the service assistance system 16 and the manufacturer information system 14. The service assistance system 16 includes a receiver 152, a server 154, and storage 155. The receiver 152 receives calibration data from the vehicle 12. The server 154 directs the flow of calibration data to the manufacturer information system 14 through the DCS 24. The storage 155 may be used when the server 154 cannot process all of the incoming calibration data.

An error check module 156 receives the calibration data from the service assistance system 16, and checks the calibration data for errors. A tampering check module 158 compares calibration data to factory calibration data. The tampering check module 158 generates a tampering flag for a vehicle service file when calibration data of the vehicle 12 does not equal factory calibration data. A database 160 can be used to store a plurality of vehicle service files. The database 160 connects to a server 162 which handles service file requests from remote locations, such as the dealership information system 26.

Figure 3B:
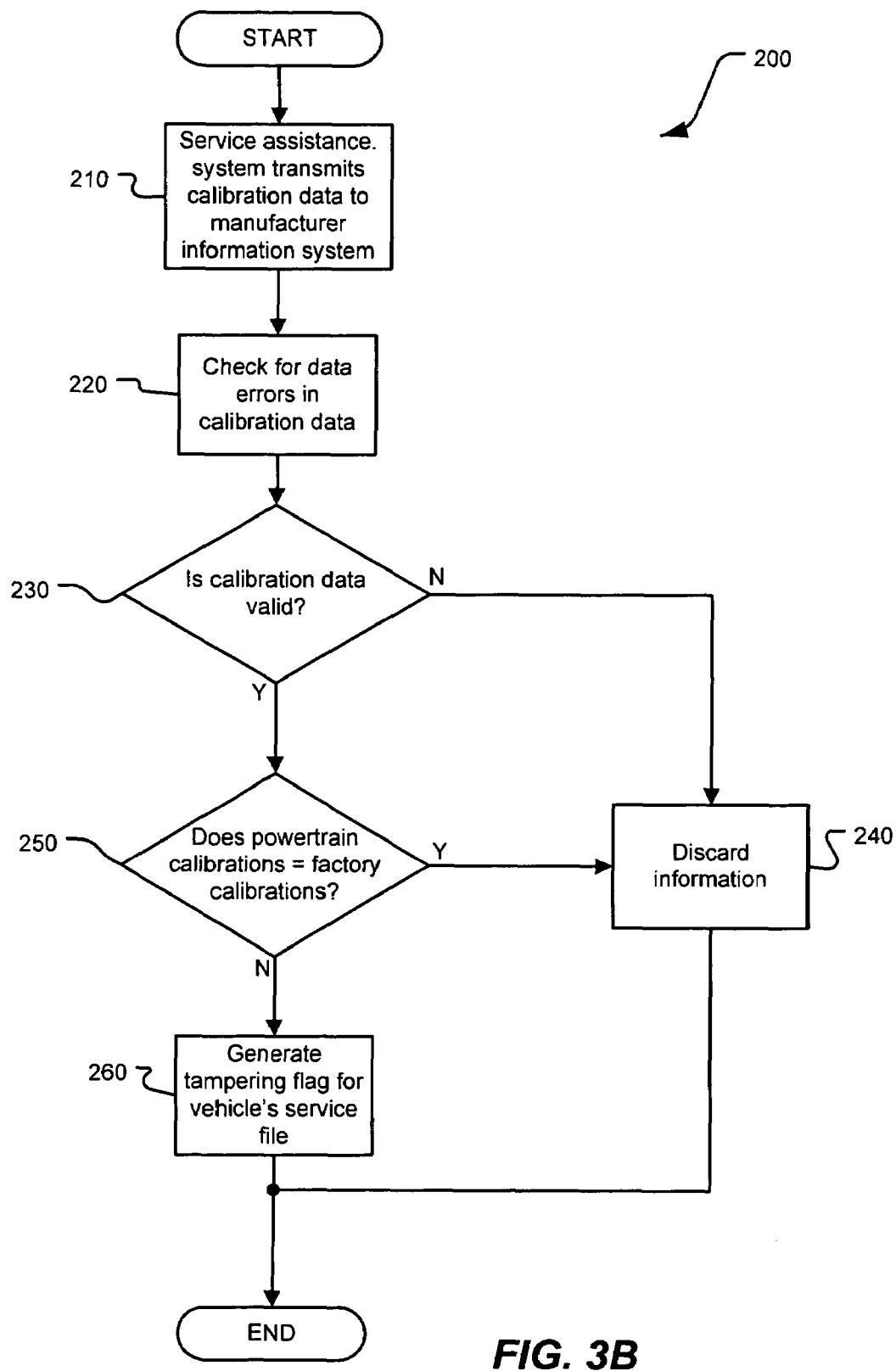
FIG. 3B is a flow chart illustrating steps for generating a tampering flag for a vehicle according to the present invention.

Referring now to FIG. 3B, a flow chart 200 illustrates the steps for generating a tampering flag for the service file of the vehicle 12, according to the present invention. In step 210, the service assistance system 16 transmits the calibration data to the manufacturer information system 14. In step 220, control uses the CRC bits and the CRC algorithm to check for errors in the calibration data. In step 230, control determines whether the calibration data is valid. If calibration data is corrupted control proceeds to step 240, where information is optionally discarded and the process ends. If calibration data is not corrupted, then control proceeds to step 250.

In step 250, control determines whether the calibration data is equal to the factory calibration data. If calibration data is equal to factory calibration data, then control optionally discards the information in step 240. If the calibration data is not equal to the factory calibration data, then control generates a tampering flag for the vehicle 12 in step 260.

Figure 4A:
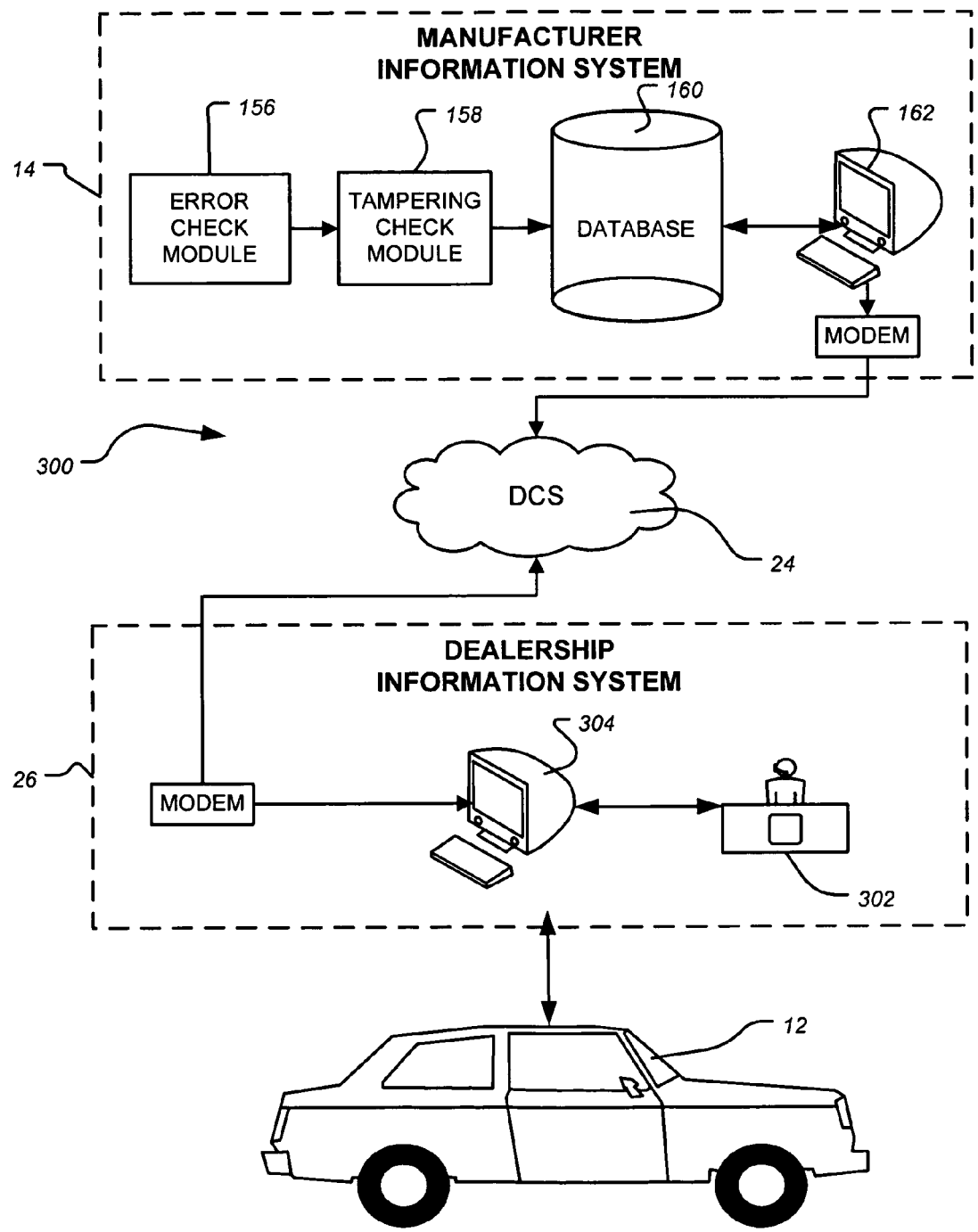
FIG. 4A is a functional block diagram illustrating the manufacturer information system and a dealership information system according to the present invention.

Referring now to FIG. 4A, a functional block diagram 300 includes the vehicle 12, the manufacturer information system 14, and the dealership information system 26. A customer brings the vehicle 12 to a local dealership, which is associated with the dealership information system 26, for service. The dealership information system 26 includes personnel 302 that use a server 304 to access the service file of the vehicle 12. The server 162 retrieves the service file of the vehicle 12 from the database 160.

Figure 4B:
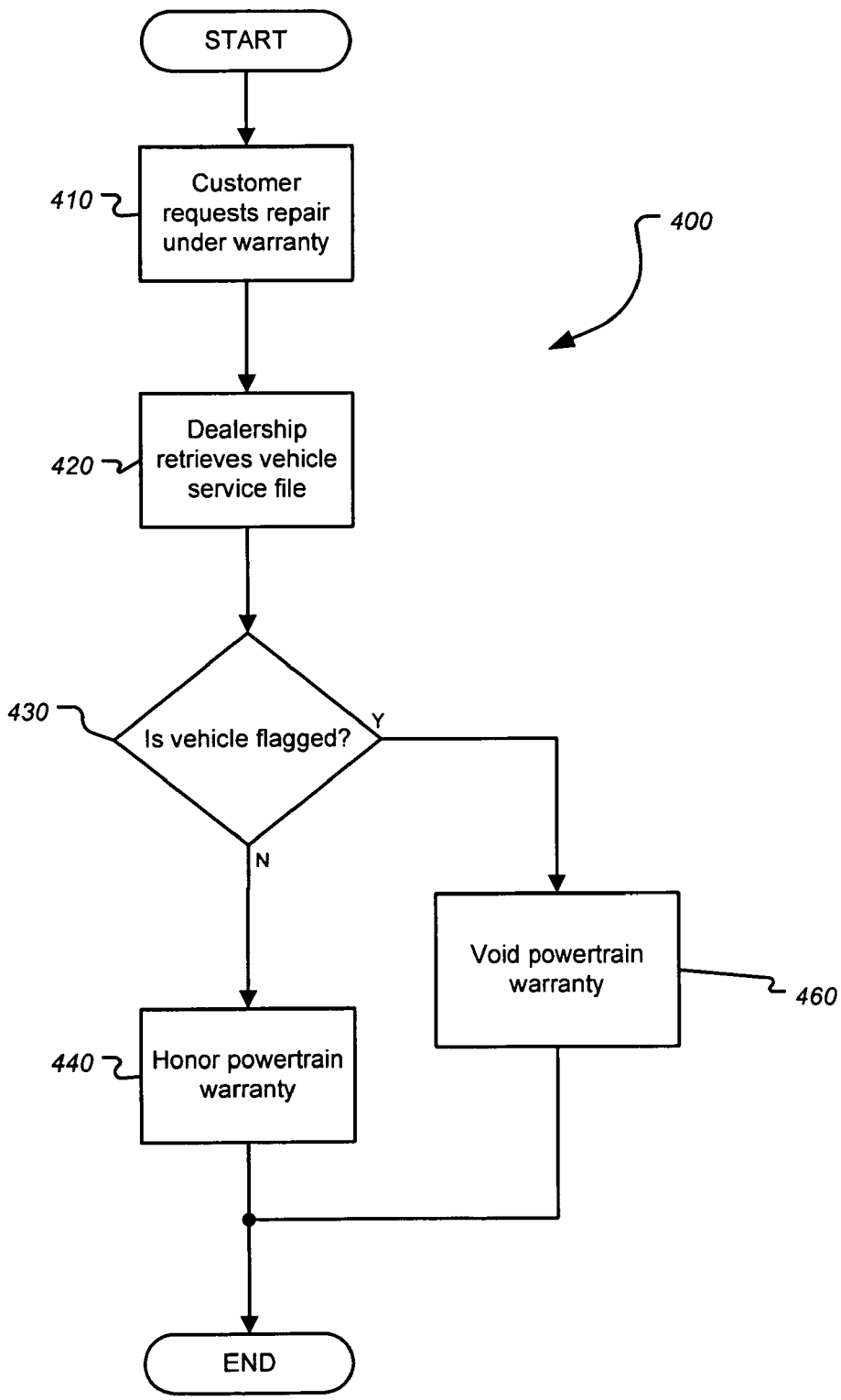
FIG. 4B is a flow chart illustrating steps for determining the validity of a warranty according to the present invention.

Referring now to FIG. 4B, a flow chart 400 illustrates the process of validating a powertrain warranty according to the present invention. In step 410, the customer brings the vehicle 12 to a dealership to have it serviced under warranty. In step 420, personnel 302 retrieve the vehicle's service file from the database 160. In step 430, personnel 302 check the vehicle's service file for a tampering flag associated with the vehicle 12. If the vehicle 12 is not flagged, then the powertrain warranty is honored in step 440 and process ends. If the vehicle is flagged, warranty is voided in step 460.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A tampering diagnostic system for a vehicle, comprising:
    a vehicle control system that encodes calibration data of the vehicle and that generates cyclical redundancy check (CRC) data for the encoded calibration data;
    a transmitter that selectively wirelessly transmits the encoded calibration data and the CRC data; and
    a manufacturer information system that is remote from the vehicle, that wirelessly receives the encoded calibration data and the CRC data, that selectively generates a tampering flag associated with the vehicle based on a comparison of the encoded calibration data and predetermined calibration data for the vehicle, and that selectively disables the comparison based on the CRC data.

2. The tampering diagnostic system of claim 1 wherein the calibration data for the vehicle includes at least one of throttle position data, fuel injection data, and transmission shiftpoint data.

3. The tampering diagnostic system of claim 1 wherein the calibration data for the vehicle includes at least one of turbocharger data and supercharger data.

4. The tampering diagnostic system of claim 1 wherein the vehicle control system encodes the calibration data into checksum data.

5. The tampering diagnostic system of claim 1 wherein the vehicle control system encodes the calibration data into one or more calibration part numbers corresponding to the calibration data.

6. The tampering diagnostic system of claim 1 wherein the manufacturer information system generates the tampering flag when the encoded calibration data is one of greater than and less than the predetermined calibration data for the vehicle.

7. A system comprising:
    the tampering diagnostic system of claim 1; and
    a dealer information system that accesses the manufacturer information system to determine whether a warranty covering a powertrain of the vehicle is voidable based on a status of the tampering flag.

8. A tampering diagnostic method for a vehicle, comprising:
    encoding calibration data of the vehicle;
    generating cyclical redundancy check (CRC) data for the encoded calibration data;
    selectively wirelessly transmitting the encoded calibration data and the CRC data;
    wirelessly receiving the encoded calibration data and the verification data at a location that is remote to the vehicle;
    selectively generating a tampering flag associated with the vehicle at the location based on a comparison of the encoded calibration data and predetermined calibration data for the vehicle; and
    selectively disabling the comparison based on the CRC data.

9. The tampering diagnostic method of claim 8 wherein the calibration data for the vehicle includes at least one of throttle position data, fuel injection data, and transmission shiftpoint data.

10. The tampering diagnostic method of claim 8 wherein the calibration data for the vehicle includes at least one of turbocharger data and supercharger data.

11. The tampering diagnostic method of claim 8 wherein the encoding comprises encoding the calibration data into checksum data.

12. The tampering diagnostic method of claim 8 wherein the encoding comprises encoding the calibration data into one or more calibration part numbers corresponding to the calibration data.

13. The tampering diagnostic method of claim 8 further comprising generating the tampering flag when the encoded calibration data is one of greater than and less than the predetermined calibration data for the vehicle.

14. The tampering diagnostic method of claim 8 further comprising accessing the tampering flag at the location to determine whether a warranty covering a powertrain of the vehicle is voidable.

* * * * *